(12) United States Patent
Kienle et al.

(10) Patent No.: US 11,280,310 B2
(45) Date of Patent: Mar. 22, 2022

(54) HYDRAULIC MACHINE HAVING A DEVICE FOR MEASURING THE WATER LEVEL IN THE INTAKE PIPE AND METHOD FOR DRAINAGE

(71) Applicant: VOITH PATENT GMBH, Heidenheim (DE)

(72) Inventors: Otto Kienle, Heidenheim (DE); Jochen Straub, Gerstetten (DE)

(73) Assignee: Voith Patent GmbH, Heidenheim (DE)

( * ) Notice: Subject to any disclaimer, the term of this patent is extended or adjusted under 35 U.S.C. 154(b) by 362 days.

(21) Appl. No.: 16/495,417

(22) PCT Filed: Feb. 8, 2018

(86) PCT No.: PCT/EP2018/053136
§ 371 (c)(1),
(2) Date: Sep. 19, 2019

(87) PCT Pub. No.: WO2018/177639
PCT Pub. Date: Oct. 4, 2018

(65) Prior Publication Data
US 2020/0025166 A1    Jan. 23, 2020

(30) Foreign Application Priority Data
Mar. 29, 2017  (DE) .................... 10 2017 106 718.3

(51) Int. Cl.
*F03B 11/00*  (2006.01)
*F03B 15/00*  (2006.01)

(52) U.S. Cl.
CPC .......... *F03B 11/008* (2013.01); *F03B 15/005* (2013.01); *F05B 2270/3015* (2013.01); *Y02E 10/20* (2013.01)

(58) Field of Classification Search
CPC ................. F03B 11/008; F03B 15/005; F05B 2270/3015; Y02E 10/20
(Continued)

(56) References Cited

U.S. PATENT DOCUMENTS 3,658,436 A * 4/1972 Oishi ...................... F03B 15/18
415/1
3,890,059 A * 6/1975 Takase .................... F03B 15/00
415/1
(Continued)

FOREIGN PATENT DOCUMENTS

CN          202091782 U     12/2011
CN          202648737 U      1/2013
(Continued)

*Primary Examiner* — Pedro J Cuevas
(74) *Attorney, Agent, or Firm* — Laurence A. Greenberg; Werner H. Stemer; Ralph E. Locher

(57) ABSTRACT

A hydraulic machine has a runner, a guide apparatus, a draft tube, and an apparatus for measuring the water level in the region of the draft tube. The apparatus includes a first pressure measuring device, a second pressure measuring device, and a unit for generating differential pressure values. The pressure measuring devices are arranged in such a way that they may detect the pressures applied inside the draft tube and are respectively connected to the unit. The first pressure measuring device is located above the second pressure measuring device, and the unit is configured to generate the difference between the pressures that the pressure measuring devices detect. There is also described a method for dewatering the runner of such a hydraulic machine.

4 Claims, 2 Drawing Sheets

(58) Field of Classification Search
USPC .............. 73/113.01; 415/1; 700/287; 405/80
See application file for complete search history.

(56) References Cited

U.S. PATENT DOCUMENTS

| | | | | | |
|---|---|---|---|---|---|
| 4,014,624 | A | * | 3/1977 | Takase | F03B 15/005 415/1 |
| 4,047,831 | A | * | 9/1977 | Mayo, Jr | F03B 11/002 415/1 |
| 4,158,525 | A | * | 6/1979 | Kawase | F03B 15/005 415/1 |
| 4,179,237 | A | * | 12/1979 | Ogiwara | F03B 11/002 415/1 |
| 4,217,077 | A | * | 8/1980 | Brcar | F03B 3/10 417/407 |
| 4,295,781 | A | * | 10/1981 | Ogiwara | F03B 15/00 415/1 |
| 4,412,779 | A | * | 11/1983 | Tsunoda | F03B 15/005 415/1 |
| 4,431,370 | A | * | 2/1984 | Ichikawa | F03B 3/103 415/112 |
| 4,502,831 | A | * | 3/1985 | Sato | F03B 15/12 415/1 |
| 4,514,138 | A | * | 4/1985 | Inagaki | F03B 11/00 415/1 |
| 4,537,558 | A | | 8/1985 | Tsunoda et al. | |
| 4,629,393 | A | * | 12/1986 | Kuwabara | F03B 15/00 415/1 |
| 4,794,544 | A | * | 12/1988 | Albright | F03B 15/06 700/287 |
| 5,322,412 | A | * | 6/1994 | Erlach | F03B 15/16 415/1 |
| 5,754,446 | A | * | 5/1998 | Fisher, Jr | F03B 15/16 700/287 |
| 5,800,077 | A | * | 9/1998 | March | E02B 5/085 405/78 |
| 5,864,183 | A | * | 1/1999 | Fisher, Jr | F03B 15/06 290/43 |
| 6,152,684 | A | * | 11/2000 | Ferme | F03B 15/16 415/1 |
| 6,269,287 | B1 | * | 7/2001 | March | E02B 5/085 405/87 |
| 6,357,389 | B1 | * | 3/2002 | March | F03B 11/00 119/219 |
| 6,490,506 | B1 | * | 12/2002 | March | G05B 23/0283 290/43 |
| 7,035,718 | B2 | * | 4/2006 | Jensen | F03B 3/02 700/280 |
| 2011/0188991 | A1 | | 8/2011 | Ciocan et al. | |
| 2014/0079532 | A1 | | 3/2014 | Kurosawa et al. | |

FOREIGN PATENT DOCUMENTS

| | | |
|---|---|---|
| CN | 204007783 U | 12/2014 |
| DE | 102011015336 A1 | 1/2012 |
| JP | S57212373 A | 12/1982 |
| JP | S59126082 A | 7/1984 |

* cited by examiner

HYDRAULIC MACHINE HAVING A DEVICE FOR MEASURING THE WATER LEVEL IN THE INTAKE PIPE AND METHOD FOR DRAINAGE

BACKGROUND OF THE INVENTION

Field of the Invention

This invention relates to the field of hydraulic machines. Such a machine may be a water turbine, pump or pump turbine that is non-positively connected or connectable to a generator, motor or motor-generator. The invention relates to hydraulic machines with Francis and Kaplan type runners. The invention relates to a method for dewatering the runner of such a machine.

Such a machine comprises a runner, a housing generally having a guide apparatus for regulating the water flow through the runner, and a draft tube which, when the machine is used as a turbine, guides the water that flows out of the runner. The hydraulic machine according to the invention also comprises an apparatus for measuring the water level in the draft tube. The measurement of the water level in the draft tube is required if the runner of the hydraulic machine is to be dewatered. Dewatering the runners in hydraulic machines usually serves two different purposes. In the first case, for starting up pump operation, runners of pumps or pump turbines are first dewatered at standstill and the runner is accelerated to synchronous speed in air. In the second case, a hydraulic machine is to be operated in phase shift operation, i.e. no active power is provided, and instead, only reactive power generated in the electrical network is compensated. For this purpose, the runner is blown out with the aid of a dewatering apparatus while rotating in water until the runner finally circulates in air in phase shift operation. The apparatus for measuring the water level in the draft tube may be used to determine whether the water level is low enough for the runner to rotate freely in air.

Generic hydraulic machines are known from the general prior art. For example, U.S. Pat. No. 3,890,059 describes one such hydraulic machine. FIG. 1 of the above text shows an apparatus for measuring the water level in the draft tube, which is marked 16. Although U.S. Pat. No. 3,890,059 does not further specify how the apparatus functions, FIG. 1 shows that the apparatus consists of a vertically arranged bypass pipe on the draft tube wall. If the water level in the draft tube changes, the water level in the bypass pipe changes according to the principle of communicating vessels. The water level in the bypass pipe is detected by a plurality of sensors arranged along the bypass pipe. Each of the sensors may determine whether it is surrounded by water or air.

It has been shown that apparatuses known from the prior art for measuring the water level in the draft tube often do not work reliably. This has the following causes: During operation and also during dewatering, the sensors arranged in the bypass pipe are subject to high vibrations, which may lead to all or some of the sensors failing completely. In addition, the vibrations during dewatering also lead to unstable sensor signals, which makes it difficult to control the dewatering process. In addition, manufacturing the bypass pipe on the draft tube is cumbersome and costly.

SUMMARY OF THE INVENTION

The object of the present invention is to provide a hydraulic machine with an apparatus for measuring the water level in the draft tube that is more robust to vibrations and more cost-effective, and with which the dewatering of the runner of the hydraulic machine may be carried out more reliably.

The inventors have recognized that this object may be accomplished by means of a hydraulic machine as claimed. Advantageous embodiments are set forth in the dependent claims. The object is accomplished by the method of dewatering the runner with the features as claimed.

BRIEF DESCRIPTION OF THE SEVERAL VIEWS OF THE DRAWING

The solution according to the invention is explained below with reference to the drawings. The drawings illustrate the following, specifically.

DESCRIPTION OF THE INVENTION

Figure 1:
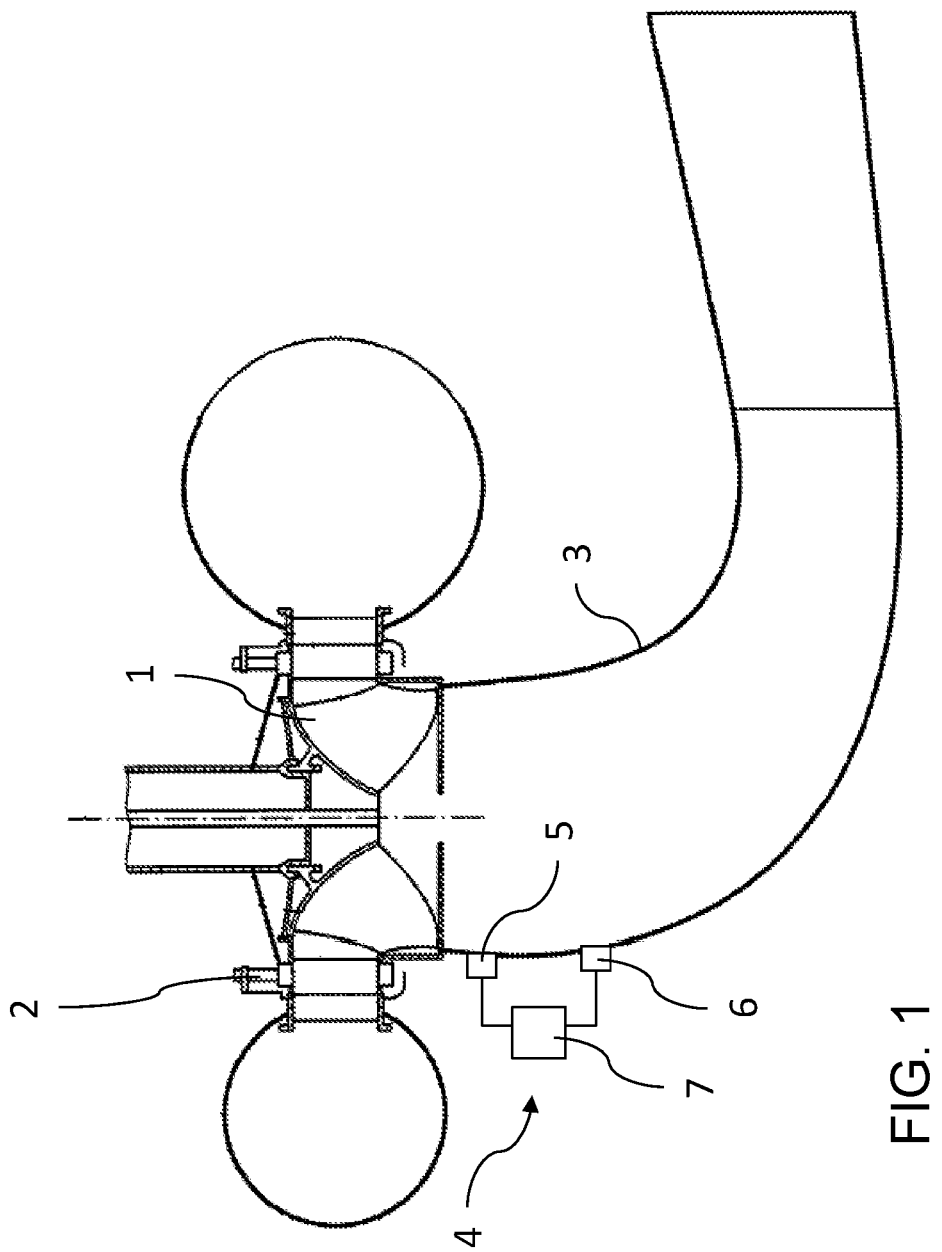
FIG. 1 Hydraulic machine according to the invention.

FIG. 1 shows a section through a hydraulic machine according to the invention. The hydraulic machine comprises a runner, marked 1, a guide apparatus, marked 2, and a draft tube, marked 3. The hydraulic machine further comprises an apparatus for measuring the water level in the draft tube; this apparatus is marked 4. The apparatus 4 comprises two pressure measuring devices, marked 5 and 6, which are respectively designed to detect the pressure inside the draft tube 3. Each of the pressure measuring devices 5 and 6 thus detects the pressure in the draft tube at the respective point. Because the runner 1 of a hydraulic machine according to the invention is arranged below the tailwater level, the entire draft tube 3 is normally completely filled with water, and the pressure that arises at a certain point inside the draft tube 3 when the shut-off device on the upstream side is closed is the hydrostatic pressure of the water column above the relevant point in the draft tube. FIG. 1 shows that the pressure measuring device 5 is above the pressure measuring device 6. "Above" here always refers to the water level, i.e. the pressure measuring devices do not have to be arranged directly above each other, but may even be located on different sides of the draft tube. The arrangement need only be such that when the water level is exactly at the pressure measuring device 5, the pressure measuring device 6 is still below the water level. The apparatus 4 further comprises a unit for generating differential pressure values, marked 7. The pressure measuring devices 5 and 6 are respectively connected to the unit 7 in such a way that the unit 7 may form the differential pressure between the pressures applied to the pressure measuring devices 5 and 6.

Figure 2:
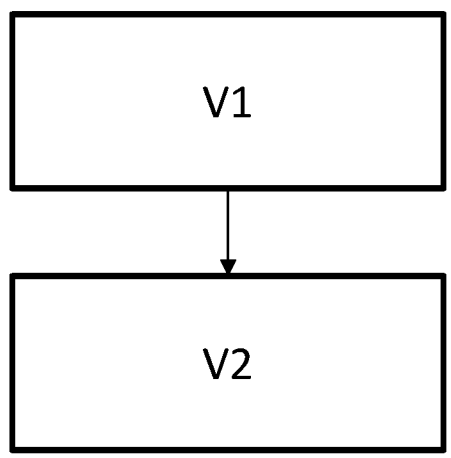
FIG. 2 Method according to the invention for dewatering the runner.

FIG. 2 shows the flow chart of the method according to the invention for dewatering the runner. A dewatering process and the associated process of measuring the water level take place as follows. At the beginning, the draft tube is completely filled with water. The guide apparatus 2 is closed and seals off the draft tube in this direction. This step is marked V1 in FIG. 2. The draft tube thus forms a U-tube with a closed end. The open end of this U-tube is the tailwater. The pressure measuring devices detect the pressure of the water column above the respective points in the draft tube. Because the water column above the location of the pressure measuring device 6 is taller than the water column above the location of the pressure measuring device 5, the pressure transmitted from the pressure measuring device 6 to the unit 7 is higher than the pressure transmitted from the pressure measuring device 5 to the unit 7. The difference between the two pressures transmitted in this state (Delta_P0) depends only on the distance between the two pressure measuring devices in a vertical direction. Now, for example, air is blown into the draft tube 3 at the upper edge of the draft tube 3 near the runner 1. This step is marked V2 in FIG. 2. A water surface forms in the draft tube that separates the air space from the water-filled space. The position of the water surface corresponds to the water level. The water displaced by the introduced air is discharged in the direction of the tailwater. Because the tailwater represents a very large reservoir, the tailwater level is not raised by the displaced water or only in a negligible way. At every point of the airspace the same pressure is present, which corresponds to the water column above the water surface (in the direction of the tailwater). As long as the water surface is above the pressure measuring device 5, the pressure values transmitted from the pressure measuring devices 5 and 6 to the unit 7 do not change (the pressure difference is Delta_P0). If the water level drops below the pressure measuring device 5, i.e. if the pressure measuring device is located in the air space, the pressure measuring device 5 transmits the pressure that is present in the air space. As long as the pressure measuring device 6 is still below the water surface, the pressure measuring device 6 transmits the same pressure value as before. If the water surface is between the two pressure measuring devices 5 and 6, then the difference of the pressures is smaller than Delta_P0. If the water surface drops so low that pressure measuring device 6 is also in the air space, both pressure measuring devices will transmit the pressure in the air space and the pressure difference becomes zero.

For the pressure difference Delta_P of the transmitted pressures, the following ranges result:

Delta_P=Delta_P0, i.e. the water surface is above the pressure measuring device 5

Delta_P0>Delta_P>0, i.e. the water surface is between the two pressure measuring devices 5 and 6.

Delta_P=0, i.e. the water surface is below the pressure measuring device 6

Plainly, in the central range (Delta_P0>Delta_P>0), the exact position of the water surface may be determined by a linear interpolation (for example, if Delta_P/Delta_P0=0.5, then the water level is exactly in the middle between the vertical positions of the pressure measuring devices 5 and 6).

The air removal process is completed when the measured differential pressure Delta_P falls below a predefined limit value.

In contrast to the known prior art, the present invention does not require a bypass pipe on the draft tube, and accordingly the manufacturing costs are markedly lower.

The inventive concept may be realized in two different embodiments. In the first embodiment, the pressure measuring devices 5 and 6 are pressure sensors that convert the pressure in the draft tube directly into an electrical signal. These signals are transmitted through electrical lines to an electronic unit 7 that electronically determines the differential pressure values from the transmitted pressure signals. This electronic unit may also be part of the control unit that controls the hydraulic machine.

In a second embodiment, the pressure measuring devices 5 and 6 respectively comprise separating membranes. The unit 7 for generating differential pressure values consists of a differential pressure transmitter, and the pressure measuring devices 5 and 6 are connected to the differential pressure transmitter 7 by means of transmission lines (capillaries). The differential pressure transmitter 7 converts the transmitted differential pressure into an electrical signal that may then be used by the control of the hydraulic machine. The second embodiment has the advantage that it is very robust against vibrations, because the actual measurement takes place in the differential pressure transmitter and may be arranged away from the draft tube. The transmission lines in this case represent a very effective decoupling between the draft tube 3 and the differential pressure transmitter 7 in terms of vibrations.

Finally, it should be mentioned that the respective tailwater level influences only the pressure values at the pressure measuring devices 5 and 6, but not the differential pressure. As a result, the determination of the water level is independent of the respective tailwater level.

The invention claimed is:

1. A hydraulic machine, comprising:
a runner, a guide apparatus, and a draft tube;
a level detector for measuring a water level in said draft tube, said level detector including a first pressure measuring device, a second pressure measuring device, and a unit for generating differential pressure values;
said first and second pressure measuring devices being disposed to detect pressures prevailing inside said draft tube and being connected to said unit;
wherein said first pressure measuring device is located above said second pressure measuring device and said unit is configured to generate a difference between the pressures respectively detected by said first and second pressure measuring devices.

2. The hydraulic machine according to claim 1, wherein:
said first and second pressure measuring devices are pressure sensors for generating an electrical pressure signal and said first and second pressure sensors are connected to said unit by way of electrical cables; and
said unit is an electronic unit for calculating an electrical differential pressure signal.

3. The hydraulic machine according to claim 1, wherein said first and second pressure measuring devices respectively comprise a separating membrane and said unit is a differential pressure transmitter, and wherein said first and second pressure measuring devices are respectively connected to said differential pressure transmitter by means of transmission lines.

4. A method for removing air from a runner of a hydraulic machine, the method comprising:
providing a hydraulic machine according to claim 1;
closing the guide apparatus;
subsequently blowing air into the draft tube near the runner; and
during the step of blowing air into the draft tube, generating with the unit a pressure difference between the pressures detected by the first and second pressure measuring devices, and aborting the step of blowing air into the draft tube when the pressure difference falls below a predefined value.

* * * * *